F. LOMBARDI.
WASHING MACHINE.
APPLICATION FILED MAY 23, 1919.

1,375,522.

Patented Apr. 19, 1921.
2 SHEETS—SHEET 1.

Witnesses
Lo. B. James

INVENTOR
F. Lombardi
BY
Victor J. Evans
ATTORNEY

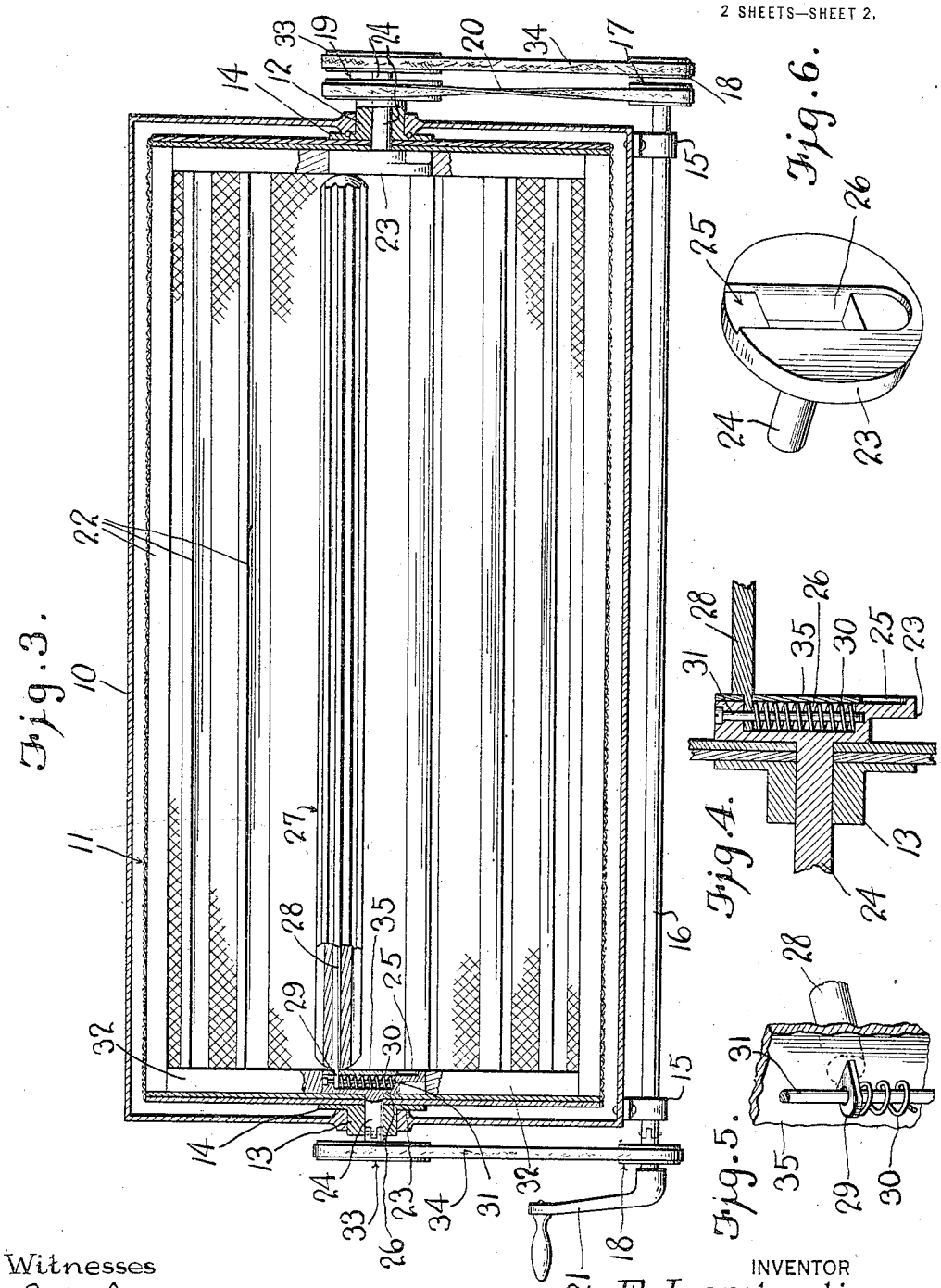

UNITED STATES PATENT OFFICE.

FRANK LOMBARDI, OF NEW YORK, N. Y.

WASHING-MACHINE.

1,375,522.	Specification of Letters Patent.	Patented Apr. 19, 1921.

Application filed May 23, 1919. Serial No. 299,088.

*To all whom it may concern:*

Be it known that I, FRANK LOMBARDI, a citizen of the United States, residing at New York city, in the county of New York and State of New York, have invented new and useful Improvements in Washing-Machines, of which the following is a specification.

This invention relates to washing machines, and comprehends certain improvements in the type of machine illustrated in Patent #1,243,413 issued to me as a joint inventor.

The present invention contemplates a construction wherein the use of gears for rotating the closed receptacle and beater in relatively reversed direction, is eliminated and the operating means arranged exteriorly of the tank so as not to be affected in any way by the water contained therein; and the mounting of the beater in the manner so that the pull or strain to which the element is subjected, by the entanglement of the clothes thereabout will not tend to dislodge the beater from its bearing.

To this end, I make use of disks journaled in each end of the tank and provided with an elongated recess in which a coiled spring is arranged. The beater shaft is provided with an apertured lug at each end, projecting within the recesses for sliding movement, while a headed pin is passed through each lug and spring, and has one end threaded to the bottom of the recess.

The nature and advantages of the invention will be more apparent when the following detail description is taken in connection with the accompanying drawings, the invention residing in the construction, combination and arrangement of parts as claimed.

In the drawings forming part of the specification like numerals of reference indicate similar parts in the several views, and wherein:

Fig. 3 is a horizontal sectional view.

Fig. 4 is an enlarged detail sectional view taken through one of the disks and its associated parts.

Fig. 5 is a detail perspective view of one end of the beater shaft and its securing pin.

Fig. 6 is a detail perspective view of one of the disks.

Figure 1:
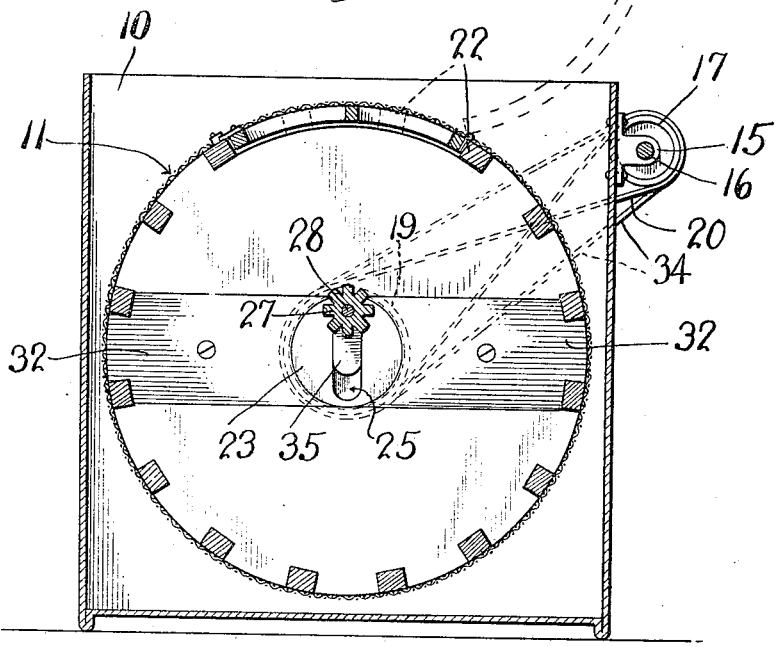
Figure 1 is a vertical sectional view through the machine.
Figure 2:
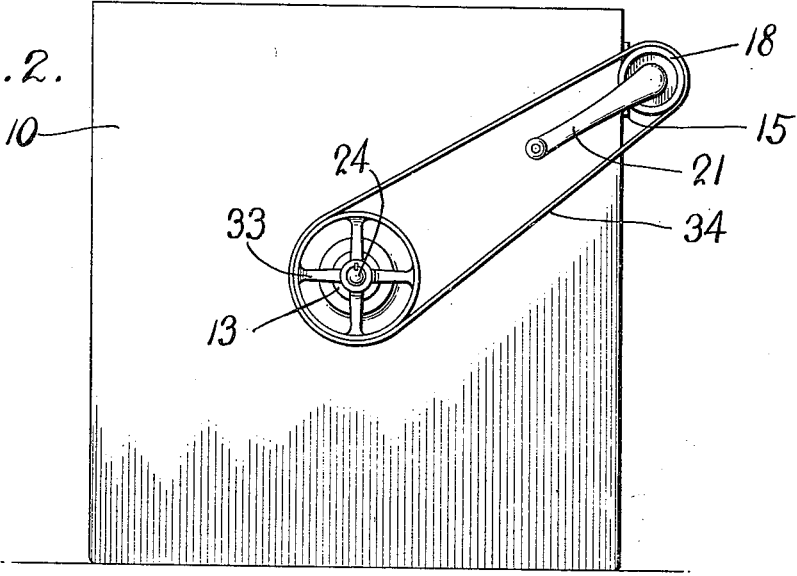
Fig. 2 is an end elevation.

Referring to the drawings in detail, 10 indicates a tank which by preference is of rectangular formation in cross section and adapted to contain water for washing of the clothes. Journaled for rotation between the end walls of the tank is a cylindrical foraminated receptacle 11 in which the clothes to be washed are arranged. For this purpose, bearings 12 and 13 respectively are journaled in suitable openings in the end walls of the tank, each bearing being provided with an enlarged flange 14 which is suitably secured to the adjacent ends of the receptacle 11. Journaled in suitable bearings 15 at one side of the tank 10 is an operating shaft 16 provided at each end with the pulleys 17 and 18 respectively. A pulley 19 is carried by the bearing 12, and over this pulley and the pulley 17 is trained a belt 20 which imparts rotation to the receptacle 11 from the shaft 16. A crank handle 21 is detachably associated with one end of the shaft 16 for rotating the latter. Extended longitudinally of the receptacle 11 and secured to the walls thereof at spaced intervals are cleats or other suitable elements 22 which assist the beater in agitating the clothes while the latter are being washed.

For the purpose of beating and agitating the clothes, when the cylinder 11 is in operation, I provide the beater disposed within the receptacle 11, and mounted to rotate within the latter in a direction reverse to the rotation of the cylinder 11. To this end, I make use of the disks 23 arranged within and adjacent the ends of the receptacle 11, each disk being provided with a stub shaft 24, journaled in the bearings 12 and 13 respectively. Each disk has one face provided with a transverse groove or recess 25 and a shoulder 26 at an appropriate point in the length of said groove. The beater consists of a roller 27 arranged within the receptacle 11 longitudinally thereof, the roller being free for rotation upon its axis or shaft 28. The shaft 28 terminates at each end to provide a reduced apertured lug 29 which is slidably received within the recess 25 of the disk while coiled springs 30 arranged in said recesses have one end bearing against the shoulder 26, the opposite ends of the spring bearing against the apertured lugs 29 of the shaft. Manifestly the springs 30 yieldably support the beater, so that the latter is permitted movement independently of the receptacle 11, to free itself from the clothes within the receptacle should the clothes tend to become entangled in any way about the beater when the machine is in operation. As above stated, the beater rotates within the receptacle in a direction reverse to the rotation of the receptacle 11 and by reason of the fact that the roller 27 is free to rotate about the shaft 28, coupled with the use of the springs 30, the rotating parts may be readily and easily operated with little if any possibility of the clothes choking or otherwise interfering with the operation of the machine. To relieve the beater of undue torsional or twisting strain while the machine is in operation, I provide headed bolts or pins 31 which are passed through the disks 23, the apertured lugs 29 of the shaft 28, and through the springs 30, the pins 31 being threaded into the shoulder 26. This affords the connection between the shaft 28 and the disks 23 sufficient rigidity to withstand the strain to which the beater is subjected and eliminate any possibility of the shaft being dislodged from the disks. To add to the rigidity of the parts, I secure to each end wall of the receptacle 11 spaced blocks of semi-cylindrical formation, the straight edge of each block being cut away to provide a bearing for the disks 23.

The stub shafts 24 of the disks project through the bearings 12 and 13 of the receptacle 11 and have fixed thereto the pulleys 33 over which and the pulleys 18 are trained the belts 34 by means of which rotation is imparted from the operating shaft 16 to the beater. It will be noted that the belt 20 is twisted or caught so that the rotation of the receptacle 11 will be in a direction reverse to the direction of rotation of the beater. The plate 35 is carried by each end of the shaft 28 and houses the springs 30 within said recesses, the plates 35 being susceptible of sliding movement within the grooves 25, the plates 35 terminating short of the ends of the groove as illustrated in Fig. 4.

While I have shown and described what I consider the preferred embodiment of the invention, I desire to have it understood that I do not limit myself to what is herein shown and described and that such changes may be resorted to when desired as fall within the scope of what is claimed.

Having thus described my invention what I claim is:—

The combination with a tank and a foraminous receptacle arranged within the tank for rotation, of an agitator disposed within the receptacle and including a shaft, hollow bushings secured to the ends of the receptacle and journaled in bearings in the adjacent walls of the tank, transverse reinforcing strips secured to the end walls of the receptacle, each strip being provided with a circular recess, a disk rotatably fitted in each recess and having a pocket formed in one face thereof, stub shafts projecting from said disks and journaled in said bushings, apertured lugs projecting from the ends of said agitator shaft and slidably fitted in the pockets of said disks, coiled springs arranged in said pockets to yieldingly support said shaft, a pin passed through said lugs and springs and secured to said disks, a plate covering said pockets of the disks and secured to the latter, and means for rotating said agitator in a direction reverse to the direction of said receptacle.

In testimony whereof I affix my signature.

FRANK LOMBARDI.